United States Patent
Hata et al.

(10) Patent No.: US 7,130,007 B2
(45) Date of Patent: *Oct. 31, 2006

(54) OPTICAL FILM, POLARIZING OPTICAL FILM, AND IMAGE VIEWING DISPLAY

(75) Inventors: Masahiro Hata, Ibaraki (JP); Ryouji Kinoshita, Ibaraki (JP); Shuuji Yano, Ibaraki (JP); Masayuki Kawai, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 139 days.

This patent is subject to a terminal disclaimer.

(21) Appl. No.: 10/863,514

(22) Filed: Jun. 9, 2004

(65) Prior Publication Data

US 2005/0018328 A1 Jan. 27, 2005

(30) Foreign Application Priority Data

Jun. 16, 2003 (JP) .............................. 2003-170534
Dec. 16, 2003 (JP) .............................. 2003-417877

(51) Int. Cl.
*G02F 1/13363* (2006.01)
*G02F 1/139* (2006.01)

(52) U.S. Cl. ........................ 349/118; 349/96; 349/141; 428/1.3

(58) Field of Classification Search ................ 349/96, 349/102, 118, 141, 117; 359/485, 490, 491, 359/497, 499–501; 428/1.3, 1.33
See application file for complete search history.

(56) References Cited

U.S. PATENT DOCUMENTS

| | | | |
|---|---|---|---|
| 6,285,430 B1 | 9/2001 | Saito | |
| 6,330,108 B1 | 12/2001 | Nishikouji et al. | |
| 6,667,835 B1 | 12/2003 | Yano et al. | |
| 6,795,246 B1 | 9/2004 | Yano et al. | |
| 2002/0075565 A1* | 6/2002 | Umemoto | 359/497 |
| 2004/0263731 A1* | 12/2004 | Hata | 349/118 |

FOREIGN PATENT DOCUMENTS

| | | |
|---|---|---|
| JP | 4-305602 | 10/1992 |
| JP | 5-157911 | 6/1993 |
| JP | 11-305217 A | 11/1999 |
| JP | 2000-56131 | 2/2000 |
| JP | 2000-169573 | * 6/2000 |
| JP | 2001-318224 A | 11/2001 |
| JP | KR 2002-0077662 | 10/2002 |
| JP | 2003-29038 A | 1/2003 |

* cited by examiner

*Primary Examiner*—Toan Ton
*Assistant Examiner*—Tai Duong
(74) *Attorney, Agent, or Firm*—Westerman, Hattori, Daniels & Adrian LLP

(57) ABSTRACT

An optical film obtained by stretching a polymer film comprising a polycarbonate resin and a styrene resin: wherein a photoelastic coefficient is $2.0 \times 10^{-11}$ to $6.0 \times 10^{-11}$ $m^2/N$, and a three dimensional refractive index is controlled so that an Nz coefficient may satisfy a relationship of $Nz \leq 0.9$ and a front retardation (Re) may satisfy a relationship of $Re \geq 80$ nm, has characteristics of giving wide viewing angle and also outstanding durability.

8 Claims, 1 Drawing Sheet

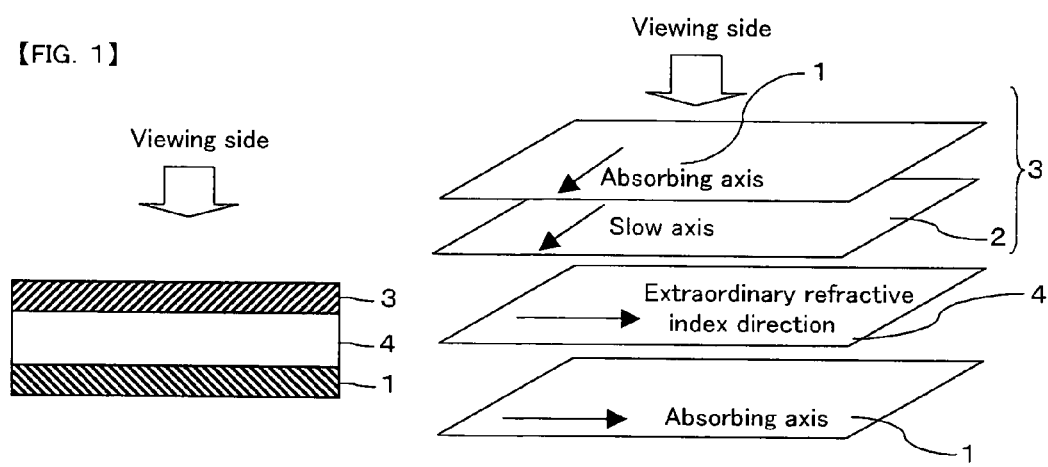
[FIG. 1]
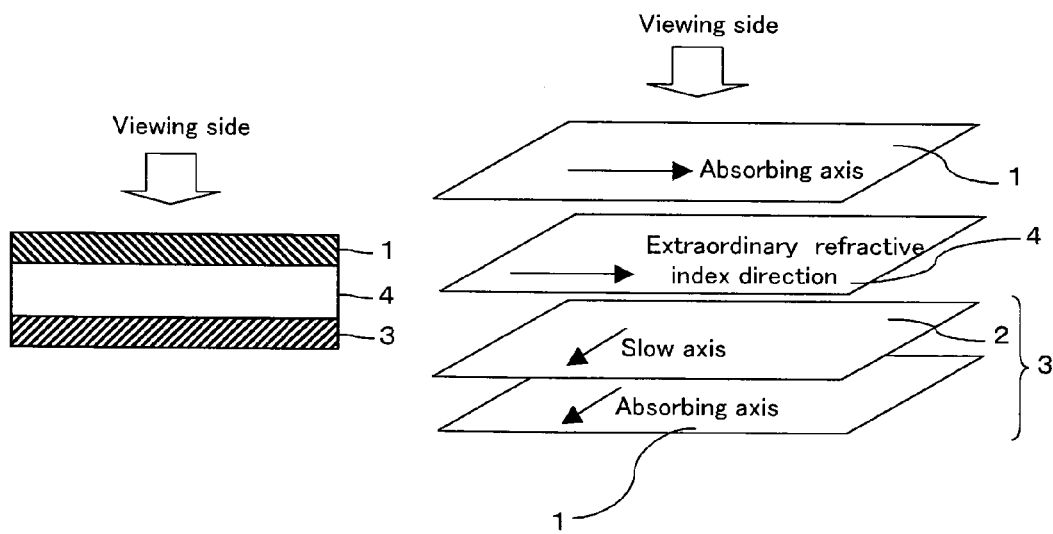
[FIG. 2]

OPTICAL FILM, POLARIZING OPTICAL FILM, AND IMAGE VIEWING DISPLAY

BACKGROUND OF THE INVENTION

1. Field of the Invention

The present invention relates to an optical film. An optical film of the present invention may be used independently or may be used in combination with other optical films as various optical films, such as retardation films, viewing angle compensation films, optical compensation films, elliptically polarizing plates, and brightness enhancement films. An optical film of the present invention is especially useful when it is laminated with polarizing plates to be used as elliptically polarizing plates.

In addition, the present invention relates to an image viewing display such as a liquid crystal display, an organic EL (electroluminescence) viewing display, a PDP using the optical film, and the elliptically polarizing plate. Especially, the optical film, and polarizing optical film of the present invention may be suitably used for liquid crystal displays that can be mounted in portable information and telecommunications instruments, personal computers, and the like. Above all, they are suitable for liquid crystal displays operating in so-called IPS mode.

2. Description of the Related Art

Conventionally, many optical films comprising various kinds of polymer materials have been used for the purpose of improving picture-quality in image viewing displays, such as portable information and telecommunications instruments, liquid crystal monitors, liquid crystal televisions, organic EL viewing displays. For example, performing stretching process for polymer films having birefringence produces such optical films. Among them when a direction wherein refractive indexes of refraction in a film plane gives a maximum is defined as an X-axis, a direction perpendicular to the X-axis is defined as a Y-axis, a thickness direction of a film is defined as a Z-axis, and refractive indexes in each axial direction are defined as nx, ny, nz, respectively, an optical film wherein a Nz coefficient expressed in a formula of (nx−nz)/(nx−ny) is controlled may preferably be used in order to widen a viewing angle of image viewing displays, such as the above-mentioned liquid crystal displays.

An Nz coefficient preferable for optical films depends upon modes (TN, VA, OCB, IPS modes, etc.) of the liquid crystal displays. Therefore, in order to obtain optical films having a required Nz coefficient polymer materials having superior film workability and birefringence that may easily be controlled into a desired Nz coefficient are suitably selected for use. For example, since optical films satisfying a relationship of Nz coefficient≦0.9 may control indexes of refraction to be at least nz>ny, polymer materials having such indexes of refraction and developing birefringence are suitably used.

Since optical films satisfying Nz coefficient≦0.9 may advantageously developing superior birefringence, for example, they may be obtained by stretching polycarbonate resin films including a unit of 2,2-bis (4-hydroxyphenyl) propane as polymer films (See Japanese Patent Laid-Open No. 5-157911 official report). The polycarbonate resins are preferable from a viewpoint of having high transparency and moderate heat resistance. However, optical films obtained by stretching of polycarbonate resin films have a large birefringence change when stress is applied; that is, they have a large photoelastic coefficient. Therefore, there occurs a problem that the optical films easily cause a large degree of unevenness when they are adhered to polarizing plates.

Moreover, in recent years, upsizing of liquid crystal panels, such as in liquid crystal televisions, increases stress that works on panels, and therefore optical film materials having smaller change of retardation (change of birefringence) is increasingly required. Moreover, the optical films have such problems that exhibit large retardation variation, under use environment after adhered onto viewing displays. Since they had this problem, the optical films were not suitable for application in recent years wherein high heat resistance, and high temperature and high moisture resistance were required.

On the other hand, as polymer materials having a comparatively small photoelastic coefficient, for example, norbornene resins are known (See Japanese Patent Laid-Open No. 2000-56131 official report). However, although the norbornene resins have a small photoelastic coefficient, they simultaneously show a characteristic to have a small birefringence, providing a limitation to retardation given by stretching process. Especially, control of three dimensional refractive index satisfying a relationship of Nz coefficient≦0.9 is difficult.

And conventionally, as a liquid crystal display, there has been mainly used a liquid crystal display in so-called TN mode in which a liquid crystal having a positive dielectric anisotropy is twisted and horizontally oriented between substrates mutually facing to each other. However, in TN mode, even if black display is required, optical leakage resulting from birefringence caused by liquid crystal molecules near a substrate made it difficult to realize perfect display of black color owing to driving characteristics thereof. On the other hand, in a liquid crystal display in IPS mode, since liquid crystal molecules have almost parallel and homogeneous orientation with respect to a substrate surface in non-driven state, light passes through the liquid crystal layer, without giving almost any change to a polarization plane, and as a result, arrangement of polarizing plates on upper and lower sides of the substrate enables almost perfect black display in non-driven state.

Although almost perfect black display may be realized in normal direction to a panel in IPS mode, when a panel is observed in a direction shifted from normal direction, inevitable optical leakage occurs caused by characteristics of a polarizing plate in a direction shifted from an optical axis of the polarizing plates disposed on upper and lower sides of the liquid crystal cell, as a result, causing to a problem of narrowing of a viewing angle.

In order to solve this problem, a polarizing plate is used in which the shift of a geometric axis of a polarizing plate given when observed from oblique direction is compensated by a retardation film. Polarizing plates providing such effect are disclosed (See Japanese Patent Laid-Open No. 4-305602, official report). However, retardation films conventionally known have not been able to easily realize sufficient wide viewing angles.

SUMMARY OF THE INVENTION

The present invention aims at providing optical film having characteristics of giving wide viewing angle, and also outstanding durability.

Moreover, the present invention aims at providing a polarizing optical film in which the optical film and a polarizing plate are laminated together.

Furthermore, the present invention aims at providing an image viewing display using the optical film and the polarizing optical film.

As a result of wholehearted research made by the present inventors in order to solve the above-mentioned problems, it was found out that the object might be attained using a following optical film, thus leading to completion of the present invention. The present invention is as follows.

That is, the present invention relates to an optical film obtained by stretching a polymer film comprising a polycarbonate resin and a styrene resin:

wherein a photoelastic coefficient is $2.0 \times 10^{-11}$ to $6.0 \times 10^{-11}$ $m^2/N$, and a three dimensional refractive index is controlled so that an Nz coefficient represented with $Nz=(nx-nz)/(nx-ny)$ may satisfy a relationship of $Nz \leq 0.9$ and a front retardation $(Re)=(nx-ny) \times d$ may satisfy a relationship of $Re \geq 80$ nm, when a direction where a refractive index in a film plane gives maximum is defined as X-axis, a direction perpendicular to X-axis as Y-axis, a thickness direction of the film as Z-axis, and when refractive indexes in each axial direction are defined as nx, ny, and nz, respectively, and a thickness of the film is defined as d (nm).

In the optical film, a weight average molecular weight of the styrene resin is preferably 20,000 or less.

In the optical film, a glass transition temperature is preferably in a range of 110 to 180° C.

The present invention is related to a polarizing optical film obtained by laminating the above-mentioned optical film and a polarizing plate.

In the polarizing optical film, the optical film and the polarizing plate are laminated so that a slow axis of the optical film and an absorbing axis of the polarizing plate may be preferably parallel to each other, or so that they may be preferably perpendicular to each other.

Moreover, the present invention is related an image viewing display wherein the above-mentioned optical film or the above-mentioned polarizing optical film is laminated.

Furthermore, the present invention is related a liquid crystal display in IPS mode:

wherein the above-mentioned polarizing optical film 5 is arranged on a liquid crystal substrate on a viewing side, a polarizing plate is arranged on a liquid crystal substrate opposite to the viewing side, and an extraordinary refractive index direction of a liquid crystalline substance in a liquid crystal cell, and an absorbing axis of the polarizing plate are parallel, in a state where voltage is not applied.

Furthermore, the present invention is related a liquid crystal display in IPS mode:

wherein a polarizing plate is arranged on a liquid crystal substrate on a viewing side, the above-mentioned polarizing optical film is arranged on a liquid crystal substrate opposite to the viewing side, and an extraordinary refractive index direction of a liquid crystalline substance in the liquid crystal cell, and an absorbing axis of the polarizing optical film are perpendicular, in a state where voltage is not applied.

An optical film of the present invention uses polymer films including styrene resins in addition to polycarbonate resins. Blending of the styrene resins enables control of a photoelastic coefficient of the optical films within a range of $2.0 \times 10^{-11}$ to $6.0 \times 10^{-11}$ $m^2/N$, realizing outstanding durability. Therefore, application of the optical film of the present invention for large-sized panels reduces change of retardation value under stress-applied conditions, enabling suitable use in application wherein, for example, high heat resistance, and high temperature and high moisture resistance are required. Photoelastic coefficient is preferably in a range of $3.0 \times 10^{-11}$ to $5.0 \times 10^{-11}$ $m^2/N$. When the photoelastic coefficient exceeds $6.0 \times 10^{-11}$ $m^2/N$, durability may not fully be exhibited and retardation change is not small under stress-applied conditions. On the other hand, when the photoelastic coefficient is less than $2.0 \times 10^{-11}$ $m^2/N$, inferior stretching processability is provided and control of Nz coefficient disadvantageously becomes difficult. Moreover, since the optical film has polycarbonate resins as a principal component, it has excellent expression of birefringence and controllability based on polycarbonate resins. Moreover, polycarbonate resins and styrene resins have excellent compatibility with each other, which gives high transparency of the optical film.

The optical film has an Nz coefficient satisfying a relationship of $Nz \leq 0.9$ defined as mentioned above, and has wide viewing angle characteristics. An Nz coefficient of $Nz>0.9$ cannot easily realize wide viewing angle. A smaller Nz coefficient is preferable, and the Nz coefficient preferably satisfies a relationship of $Nz \leq 0.7$. Furthermore, the Nz coefficient preferably satisfies a relationship of $Nz \leq 0.5$. In addition, the optical film may satisfy a relationship of $(nx-nz)<0$, and the Nz coefficient may also have a negative values. However, in order to expand viewing angles in four directions (upward, downward, rightward, and leftward) the Nz coefficient is preferably controlled −1 or more, and more preferably −0.5 or more.

Moreover, a front retardation (Re) of the optical film satisfies a relationship of $Re \geq 80$ nm. An Re of Re<80 nm makes control of nx, ny, and nz difficult. An Re preferably satisfies a relationship of $Re \geq 90$ nm, more preferably $Re \geq 100$ nm. However, in order to control Re, preferably the Re satisfies a relationship of $Re \leq 400$ nm. Moreover, a thickness direction retardation: $(nx-nz) \times d$ is −400 to 400 nm, and more preferably −200 to 200 nm.

In application of the optical film to liquid crystal displays in IPS mode, it is preferably a quarter wavelength plate or a half wavelength plate. In use as a ¼ wavelength plate of the optical film, the Re is preferably 110 to 150 nm, and more preferably 120 to 140 nm. Moreover in that case, the thickness direction retardation is preferably 10 to 120 nm, and more preferably 30 to 80 nm. In use as a half wavelength plate of the optical film, the Re is preferably 200 to 300 nm, and more preferably 230 to 270 nm. Moreover in that case, the thickness direction retardation is preferably 10 to 250 nm, and more preferably 50 to 200 nm.

The optical film (for example, retardation film) of the present invention may be used for a polarizing optical film in a state laminated with a polarizing plate. A polarizing optical film wherein the optical film is laminated with a polarizing plate so that a slow axis of the optical film and an absorbing axis of the polarizing plate may be parallel to each other, or so that they may be perpendicular to each other, can compensate a shift of geometric optical axis of the polarizing plate caused when observed in a oblique direction, and, as a result, can provide a wide viewing angle.

The optical film and polarizing optical film may be used for various kinds of image viewing displays, and liquid crystal displays in IPS mode are suitable as the image viewing displays. Disposing of the polarizing optical film on either one surface of liquid crystal cells in IPS mode can reduce leakage of light that has been caused in liquid crystal displays of IPS mode in black display. This type of liquid crystal displays in IPS mode has a high contrast ratio over all directions, and can realize easily viewable display having a wide viewing angle.

BRIEF DESCRIPTION OF THE DRAWINGS

FIG. 1 is an example of conceptual diagram of a liquid crystal display of the present invention; and FIG. 2 is an example of other conceptual diagrams of a liquid crystal display of the present invention.

DESCRIPTION OF THE PREFERRED EXAMPLES

An optical film of the present invention may be obtained by stretching of polymer films comprising polycarbonate resins and styrene resins.

Various kinds of polycarbonate resins used for optical films may be used without any special limitation. As polycarbonate resins, for example, aromatic polycarbonates consisting of aromatic series bivalent phenol components and carbonate components are preferable.

As examples of aromatic series bivalent phenolic compounds, there may be used: 2,2-bis(4-hydroxy phenyl)propane, 2,2-bis(4-hydroxy-3,5-dimethyl phenyl)propane, bis(4-hydroxy phenyl)methane, 1,1-bis(4-hydroxy phenyl)ethane, 2,2-bis(4-hydroxy phenyl)butane, 2,2-bis(4-hydroxy-3,5-dimethyl phenyl)butane, 2,2-bis(4-hydroxy-3,5-dipropyl phenyl)propane, 1,1-bis(4-hydroxy phenyl)cyclohexane, and others. These may be used independently, and two or more kinds may be used in combination. Especially, 2,2-bis(4-hydroxy phenyl)propane, 1,1-bis(4-hydroxy phenyl)cyclohexane, and 1,1-bis(4-hydroxy phenyl)-3,3,5-trimethyl cyclohexane are preferable. Polycarbonates including a unit of 2,2-bis(4-hydroxy phenyl)propane has outstanding workability, high transparency, and can provide excellent expression of birefringence, and may be used independently. Moreover, in addition to this unit of 2,2-bis(4-hydroxy phenyl)propane, it is preferable that a unit of 1,1-bis(4-hydroxy phenyl)-3,3,5-trimethyl cyclohexane is used together. In using both of them in combination, for example, variation of a percentage to be used can adjust a glass transition temperature (henceforth referred to as Tg) and a photoelastic coefficient of the film. That is, a high content of a component originated in 1,1-bis (4-hydroxy phenyl)-3,3,5-trimethyl cyclohexane in a polycarbonate resin can give a high Tg, and a small photoelastic coefficient. However, since the optical film is obtained by performing stretching process to polymer films, a Tg that is controlled moderately low may give excellent workability. Therefore, a content of a component originated in 1,1-bis(4-hydroxy phenyl)-3,3,5-trimethyl cyclohexane in the polycarbonate resin is preferably 4 times or less in molar ratio with respect to the component originated in 2,2-bis(4-hydroxy phenyl) propane.

In addition, as carbonate components, preferably used are: phosgene, bischloroformate of the bivalent phenols, diphenyl carbonate, di-p-tolyl carbonate, phenyl-p-tolyl carbonate, di-p-chloro phenyl carbonate, dinaphthyl carbonate, etc. Phosgene and diphenyl carbonate are especially preferable.

On the other hand, styrene resins may be obtained by polymerizing styrene based monomers. As styrene based monomers, for example, styrene, α-methylstyrene, 2,4-dimethylstyrene etc. maybe mentioned. These may be independently used, and two or more kinds may be used in combination. Usually, homopolymerized polymer of styrene or polymers using styrene as a principal component and styrene based monomers as combined monomers are used.

Styrene based resins preferably have a weight average molecular weight of 20,000 or less measured by GPC method. A reason is that since a weight average molecular weight exceeding 20,000 worsens compatibility with polycarbonate resins and as a result transparency of the obtained film is reduced, it makes the film unsuitable for optical application requiring transparency. Therefore a weight average molecular weight is preferably 10,000 or less. On the other hand, since an excessively small weight average molecular weight disadvantageously accelerates elution of low molecule components under high temperature and high humidity environment, the weight average molecular weight is preferably 500 or more, and more preferably 1,000 or more.

A ratio of the polycarbonate resins and styrene resins is suitably adjusted so that excellent transparency of the polymer films (optical film) may be obtained and a photoelastic coefficient may be in the above-mentioned range. Usually, when a sum total of polycarbonate resins and styrene resins is 100% by weight, a content of styrene resin is preferably 2 to 50% by weight. A content of less than 2% by weight of the styrene resins makes difficult control of a photoelastic coefficient to a low enough value. Taking such a reason into consideration, a content of the styrene resins is preferably 5% or more by weight, and more preferably 10% or more by weight. On the other hand, a content exceeding 50% by weight disadvantageously reduces a Tg of the polymer films. From this viewpoint, a content of styrene resins is preferably 40% or less by weight, and more preferably 30% or less by weight.

Moreover, taking a fact into consideration that a Tg of a polymer film (optical film) gives influence to heat-resisting property of the film, a higher Tg is preferable. On the other hand, optical films are obtained by stretching polymer films. Since stretching is fundamentally performed under temperature conditions near the Tg, if stretching processability is taken into consideration, a Tg controlled lower is more preferable. From this viewpoint, a Tg of the polymer films (optical films) is preferably 110 to 180° C., more preferably 120 to 170° C., and still more preferably 130 to 160° C.

Stretching process is given to the polymer films comprising polycarbonate resins and styrene resins to produce an optical film wherein a three dimensional refractive index is controlled so that an Nz coefficient satisfies a relationship of $Nz \leq 0.9$, and a front retardation (: Re) satisfies a relationship of $Re \geq 80$ nm.

Stretching methods are not especially limited, but a method of biaxially stretching a polymer film in a planar direction; and a method of uniaxially or biaxially stretching in a planar direction and stretching also in a thickness direction may be mentioned. And a method or the like may be mentioned in which a heat-shrinkable film is adhered to a polymer film, and then the combined film is stretched and/or shrunk under a condition of being influenced by a shrinking force caused by heat. These methods can control a refractive index in a thickness direction and as a result can control a state of orientation so that a three dimensional refractive index of the stretched film may satisfy relationships of $Nz \leq 0.9$ and $Re \geq 80$ nm. In addition, a stretching ratio is suitably controlled. In case of uniaxially stretching using a heat-shrinkable film, the stretching ratio is 1.0 to 3.0 times, and preferably 1.0 to 2.0 times. Although a thickness (d) of the optical film obtained by stretching is not especially limited, but it is preferably 1 to 150 μm, and more preferably 5 to 50 μm.

An optical film of the present invention may independently be used as retardation films, viewing angle compensation films, and optical compensation films, or may be used as elliptically polarizing plates, brightness enhancement films, etc. in combination with other optical films. Especially an optical film of the present invention is useful as an elliptically polarizing plate being laminated with a polarizing plate.

A polarizing plate usually comprises a protective film one side or both side of a polarizer. The polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the protective film prepared on one side or both sides of the polarizer, materials is excellent in transparency, mechanical strength, heat stability, water shielding property, isotropy, etc. may be preferably used. As materials of the above-mentioned protective layer, for example, polyester type polymers, such as polyethylene terephthalate and poly-ethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

As a protective film, if polarization property and durability are taken into consideration, triacetyl cellulose film whose surface is saponificated with alkali is preferable. In general, a thickness of the protective film, which can be determined arbitrarily, is 10 to 500 μm less in viewpoint of strength, work handling and thin layer, preferably 20 to 300 μm, and especially preferably 30 to 300 μm.

Moreover, it is preferable that the protective film may have as little coloring as possible. Accordingly, a protective film having a retardation value in a film thickness direction represented by $Rth=[(nx+ny)/2-nz]\times d$ of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of −90 nm through +75 nm in a thickness direction. The retardation value (Rth) in a thickness direction is preferably −80 nm through +60 nm, and especially preferably −70 nm through +45 nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, and etc. may be mentioned.

A hard coat layer may be prepared, or antireflection processing, processing aiming at sticking prevention, diffusion or anti glare may be performed onto the face on which the polarizing film of the above described protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

The optical film of the present invention and the polarizing plate are laminated with an adhesive layer. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Proper method may be carried out to form an adhesive layer. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film and a polarizing optical film of the present invention may suitably be used in image viewing displays. Especially a polarizing optical film of the present invention may suitably be used for liquid crystal displays in IPS mode.

A liquid crystal display in IPS mode has a liquid crystal cell comprising: a pair of substrates sandwiching a liquid crystal layer; a group of electrodes formed on one of the above-mentioned pair of substrates; a liquid crystal composition material layer having dielectric anisotropy sandwiched between the above-mentioned substrates; an orientation controlling layer that is formed on each of surfaces, facing each other, of the above-mentioned pair of substrates in order to orient molecules of the above-mentioned liquid crystal composition material in a predetermined direction, and driving means for applying driver voltage to the above-mentioned group of electrodes. The above-mentioned group of electrodes has alignment structure arranged so that parallel electric field may mainly be applied to an interface to the above-mentioned orientation controlling layer and the above-mentioned liquid crystal composition material layer.

As shown in FIG. 1 and FIG. 2, a polarizing optical film 3 laminating an optical film 2 (retardation film 2) of the present invention and a polarizing plate 1 is disposed on a viewing side or on an opposite side (light incident side) of a liquid crystal cell 4. In FIG. 1 and FIG. 2, although a case is illustrated where a slow axis of the optical film 2 (retardation film 2) and an absorbing axis of the polarizing plate 1 are perpendicular mutually, these axes may be parallel to each other. In the polarizing optical film 3, the retardation film 2 side is preferably disposed on the liquid crystal cell 4 side. The polarizing plate 1 is disposed on an opposite side of the liquid crystal cell 4 in which the polarizing optical film 3 has been disposed. The absorbing axis of the polarizing plates 1 and an absorbing axis of the polarizing optical film 3 (polarizing plate 1) disposed on both sides of the liquid crystal cell 4 are disposed in a mutually perpendicular state.

As is shown in FIG. 1, when the polarizing optical film 3 is arranged on a viewing side of the liquid crystal cell 4 in IPS mode, on the liquid crystal cell 4 opposite to the viewing side (a light incident side), the polarizing plate 1 is preferably arranged so that an extraordinary refractive index direction of liquid crystalline substance in the liquid crystal cell 4 and the absorbing axis of the polarizing plate 1 may be parallel in a state where voltage is not applied.

Moreover as is shown in FIG. 2, when the polarizing optical film 3 is arranged on a light incident side of the liquid crystal cell 4 in IPS mode, the polarizing plate 1 is preferably arranged on a liquid crystal cell 4 in a viewing side so that an extraordinary refractive index direction of liquid crystalline substance in the liquid crystal cell 4 and the absorbing axis of the polarizing optical film 3 (the polarizing plate 1) may be perpendicular to each other in a state where voltage is not applied.

Moreover, an optical film and a polarizing optical film of the present invention are preferably used for production of various equipments, such as transflective type liquid crystal displays. Transflective type liquid crystal displays etc. are suitably used as portable information and telecommunications instruments and personal computers. When producing the reflective semitransparent type liquid crystal displays, a polarizing optical film by the present invention is preferably disposed on a viewing side of the liquid crystal cell. An optical film and polarizing optical film of the present invention may be applied to various kinds of liquid crystal displays.

The above-mentioned optical film and polarizing optical film may be used in a state where other optical films are laminated thereto on the occasion of practical use. The optical films used here are not especially limited, and, for example, one layer or two or more layers of optical films that may be used for formation of liquid crystal displays, such as reflectors, semitransparent plates, and retardation plates (including half wavelength plates and quarter wavelength plates etc.) may be used. Especially, a reflection type polarizing plate or a semitransparent type polarizing plate in which a reflector or a semitransparent reflector is further laminated to a polarizing plate, and a polarizing plate in which a brightness enhancement film is further laminated to a polarizing plate are preferable.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an oriented film of cholesteric liquid-crystal polymer; a film that has the characteristics of reflecting a circularly polarized light with either left-handed or right-handed rotation and transmitting other light, such as a film on which the oriented cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

Assembling of a liquid crystal display may be carried out according to conventional methods. That is, a liquid crystal display is generally manufactured by suitably assembling several parts such as a liquid crystal cell, optical elements and, if necessity, lighting system, and by incorporating driving circuit. In the present invention, except that a polarizing optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the polarizing optical film has been located at one side or both sides of the liquid crystal cell, and with which a backlight or a reflector is used for a lighting system may be manufactured. In this case, the optical polarizing film by the present invention may be installed in one side or both sides of the liquid crystal cell. When installing the optical elements in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Hereinafter, detailed descriptions for embodiments of the present invention will be given, with reference to Examples and Comparative Examples, but the present invention is not to be limited by these Examples and Comparative Examples. The characteristics of optical films (after stretched) etc. of each Example were measured by following methods.

<Photoelastic Coefficient>

Using Ellipsomter manufactured by JASCO Corporation (M220), a stressed refractive index was measured when a stress of $1\times10^{-6}$ to $30\times10^{-6}$ was applied to an optical film with a width of 2 cm at room temperature (23° C.). The obtained measured values were plotted and a photoelastic coefficient c: ($m^2/N$) was calculated from stress birefringence $\Delta n = c\delta$. Where, $\delta$ represents stress ($N/m^2$).

<Measurement of Refractive Index: Nz Coefficient, Re>

In measurement of refractive index of optical films, each of main refractive indexes nx, ny, and nz in a film plane direction and in a thickness direction were measured as a value for $\lambda=590$ nm using an automatic birefringence measuring equipment (manufactured by Oji Scientific Instruments, automatic birefringence meter). Nz=(nx−nz)/(nx−ny) was calculated from acquired refractive index values. Moreover, a front retardation (Re)=(nx−ny)×d was calculated from refractive index values and an optical film thickness (d: nm).

<Glass Transition Temperature: Tg>

It was measured with a heating rate of 10°/minute under nitrogen air current of 20 ml/minute using a DSC 5500 manufactured by Seiko Instruments Inc.

<Weight Average Molecular Weight>

A weight average molecular weight of tetrahydrofuran soluble portion was calculated with HLC-8120 GPC system manufactured by TOSOH CORPORATION using a gel permeation chromatography (GPC) method (by polystyrene standard).

Example 1

(Polymer Film)

As a polymer film including a polycarbonate resin and a styrene resin, PF film (thickness of 55 μm): a product name, manufactured by Kaneka Corp. was used. The polycarbonate resin includes a polymer originated in 2,2-bis(4-hydroxy phenyl)propane, and 1,1-bis(4-hydroxy phenyl)-3,3,5-trimethyl cyclohexane with a blending ratio of 40:60 (by weight ratio). Moreover, a content ratio of a styrene resin (weight average molecular weight 10,000) in the polymer film was 20% by weight.

(Optical Film)

Heat-shrinkable films, which are a biaxially stretched polyester film, were adhered on both sides of the polymer film (PF film) through pressure sensitive adhesive layers. Then, the obtained film was held with a simultaneous biaxial stretching machine, and stretched 1.3 times at 145° C. The obtained stretched film was transparent, and had a thickness of 60 μm, a front retardation of 140 nm, a thickness direction retardation of 70 nm, and an Nz coefficient of 0.5. Moreover, a photoelastic coefficient gave $5.0\times10^{-11}$, and Tg 140° C.

Example 2

(Optical Film)

Heat-shrinkable films, which are a biaxially stretched polyester film, were adhered on both sides of a polymer film (PF film) used in Example 1 through pressure sensitive adhesive layers. Then, the obtained film was held with a simultaneous biaxial stretching machine, and was stretched 1.1 times at 146° C. The obtained stretched film was transparent, and had a thickness of 61 μm, a front retardation of 130 nm, a thickness direction retardation of 39 nm, and an Nz coefficient of 0.3. Moreover, a photoelastic coefficient gave $5.0\times10^{-11}$, and Tg 140° C.

Comparative Example 1

(Polymer Film)

As a polymer film including a polycarbonate resin, R film (thickness of 70 μm): a product name, manufactured by Kaneka Corp. was used.

(Optical Film)

Heat-shrinkable films, which are a biaxially stretched polyester film, were adhered on both sides of the polymer film (R film) through pressure sensitive adhesive layers. Then, the obtained film was held with a simultaneous biaxial stretching machine, and stretched 1.1 times at 165° C. The obtained stretched film was transparent, and had a thickness of 80 μm, a front retardation of 140 nm, a thickness direction retardation of 70 nm, and an Nz coefficient of 0.5. Moreover, a photoelastic coefficient gave $12.0\times10^{-11}$, and Tg 155° C.

Comparative Example 2

(Polymer Film)

As a polymer film, Arton 2 (thickness of 70 μm): a product name, manufactured by JSR was used.

(Optical Film)

Heat-shrinkable films, which are a biaxially stretched polyester film, were adhered on both sides of the polymer film (Arton 2) through pressure sensitive adhesive layers. Then, the obtained film was held with a simultaneous biaxial stretching machine, and stretched 1.3 times at 140° C. The obtained stretched film had a thickness of 60 μm, a front retardation of 140 nm, a thickness direction retardation of 133 nm, and an Nz coefficient of 0.95. Moreover, a photoelastic coefficient gave $1.0\times10^{-11}$, and Tg 130° C. The obtained optical film had intense unevenness in a film plane, and gave opaque appearance.

The optical film (retardation film) obtained in the above Examples and Comparative Examples and the polarizing plate (manufactured by NITTO DENKO CO., LTD., TEG1465DU) were laminated through a pressure sensitive adhesive layer (acrylic based pressure sensitive adhesive, 30 μm in thickness) so that a slow axis of the optical film and an absorbing axis of the polarizing plate might perpendicularly intersect, to obtain polarizing optical films. The polarizing optical films were cut to 20 cm×30 cm samples. The samples concerned were evaluated for following characteristics. Table 1 shows the results.

(Durability)

A sample was adhered on an alkali free glass board, and, subsequently introduced into an autoclave. Then, after being kept standing at room temperature (23° C.) for 24 hours, the sample was subjected to following durability test and evaluated for change in front retardation (Re) with time.

Condition (1): 80° C.×500 hours

Condition (2): 60° C., 90% RH×500 hours

Condition (3): a heat shock of −30 to 85° C., 30 minutes each×100 times (Uniformity of Display)

As uniformity of display, after durability test, diagonal unevenness (unevenness around four corners of the sample) in black display was visually observed based on following criteria.

○: No diagonal unevenness in black display x: Diagonal unevenness in black display observed (Contrast of Liquid Crystal Display)

As shown in FIG. 1, a retardation film side of a polarizing optical film was laminated with a pressure sensitive adhesive so that it might be disposed on a surface of viewing side of a liquid crystal cell in IPS mode. On the other hand, a polarizing plate (manufactured by NITTO DENKO CO., LTD., TEG1465DU) was laminated with a pressure sensitive adhesive on an opposite side to the liquid crystal cell to produce a liquid crystal display. A polarizing plate on the viewing side was laminated so that an extraordinary light refractive index direction of liquid crystal composition in the liquid crystal cell and an absorbing axis of the polarizing plate might perpendicularly intersect with each other when no voltage impressed. Moreover, the absorbing axis of the polarizing plate and the absorbing axis of the polarizing optical film were disposed so that they might perpendicularly intersect with each other.

In this liquid crystal display, a contrast ratio was measured at an inclination angle of 70° with respect to the normal line in an azimuth displaced by 45° from perpendicularly intersecting optical axes of the polarizing plates. Measurement of a contrast ratio was performed using an EZ Contrast (manufactured by ELDIM).

TABLE 1

| | Before test | Durability After test | | | Uniformity of display | Contrast ratio |
|---|---|---|---|---|---|---|
| | | Condition (1) | Condition (2) | Condition (3) | | |
| Example 1 | 140 nm | 142 nm | 144 nm | 141 nm | ○ | 35 |
| Example 2 | 130 nm | 132 nm | 134 nm | 131 nm | ○ | 35 |
| Comparative Example 1 | 140 nm | 146 nm | 148 nm | 143 nm | X | 35 |
| Comparative Example 2 | 133 nm | 134 nm | 135 nm | 133 nm | ○ | 5 |

What is claimed is:

1. An optical film obtained by stretching a polymer film comprising a polycarbonate resin and a styrene resin, said styrene resin having a weight average molecular weight of 20,000 or less:
   wherein a photoelastic coefficient is $2.0 \times 10^{-11}$ to $6.0 \times 10^{-11}$ m$^2$/N, and
   a three dimensional refractive index is controlled so that an Nz coefficient represented with Nz=(nx−nz)/(nx−ny) satisfies a relationship of Nz≦0.9 and a front retardation (Re)=(nx−ny)×d satisfies a relationship of Re≧80 nm, when a direction where a refractive index in a film plane gives maximum is defined as X-axis, a direction perpendicular to X-axis as Y-axis, a thickness direction of the film as Z-axis, and when refractive indexes in each axial direction are defined as nx, ny, and nz, respectively, and a thickness of the film is defined as d (nm).

2. The optical film according to claim 1, wherein a glass transition temperature is in a range of 110 to 180° C.

3. A polarizing optical film obtained by laminating the optical film according to claim 1 and a polarizing plate.

4. The polarizing optical film according to claim 3, wherein the optical film and the polarizing plate are laminated so that a slow axis of the optical film and an absorbing axis of the polarizing plate may be parallel to each other, or so that they may be perpendicular to each other.

5. An image viewing display wherein the optical film according to claim 1 is laminated.

6. An image viewing display wherein the polarizing optical film according to claim 3 is laminated.

7. A liquid crystal display in IPS mode:
   wherein a polarizing optical film obtained by laminating an optical film and a polarizing plate is arranged on a liquid crystal substrate on a viewing side,
   a polarizing plate is arranged on a liquid crystal substrate opposite to the viewing side, and
   an extraordinary refractive index direction of a liquid crystalline substance in a liquid crystal cell, and an absorbing axis of the polarizing plate are parallel, in a state where voltage is not applied,
   wherein the optical film is an optical film obtained by stretching a polymer film comprising a polycarbonate resin and a styrene resin:
   wherein a photoelastic coefficient is $2.0 \times 10^{-11}$ to $6.0 \times 10^{-11}$ m$^2$/N, and
   a three dimensional refractive index is controlled so that an Nz coefficient represented with Nz=(nx−nz)/(nx−ny) satisfies a relationship of Nz≦0.9 and a front retardation (Re)=(nx−ny)×d satisfies a relationship of Re≧80 nm, when a direction where a refractive index in a film plane gives maximum is defined as X-axis, a direction perpendicular to X-axis as Y-axis, a thickness direction of the film as Z-axis, and when refractive indexes in each axial direction are defined as nx, ny, and nz, respectively, and a thickness of the film is defined as d (nm).

8. A liquid crystal display in IPS mode:
   wherein a polarizing plate is arranged on a liquid crystal substrate on a viewing side,
   a polarizing optical film obtained by laminating an optical film and a polarizing plate is arranged on a liquid crystal substrate opposite to the viewing side, and
   an extraordinary refractive index direction of a liquid crystalline substance in the liquid crystal cell, and an absorbing axis of the polarizing optical film are perpendicular, in a state where voltage is not applied,
   wherein the optical film is an optical film obtained by stretching a polymer film comprising a polycarbonate resin and a styrene resin:
   wherein a photoelastic coefficient is $2.0 \times 10^{-11}$ to $6.0 \times 10^{-11}$ m$^2$/N, and
   a three dimensional refractive index is controlled so that an Nz coefficient represented with Nz=(nx−nz)/(nx−ny) satisfies a relationship of Nz≦0.9 and a front retardation (Re)=(nx−ny)×d satisfies a relationship of Re≧80 nm, when a direction where a refractive index in a film plane gives maximum is defined as X-axis, a direction perpendicular to X-axis as Y-axis, a thickness direction of the film as Z-axis, and when refractive indexes in each axial direction are defined as nx, ny, and nz, respectively, and a thickness of the film is defined as d (nm).

* * * * *